United States Patent
Stanhope

(10) Patent No.: US 10,760,454 B2
(45) Date of Patent: Sep. 1, 2020

(54) OIL CONTROL VALVE TO CONTROL A CAM PHASER WITH A SPOOL POSITIONED BY AN EXTERNAL ACTUATOR AND HAVING A GROOVE

(71) Applicant: ECO Holding 1 GmbH, Marktheidenfeld (DE)

(72) Inventor: Daniel Stanhope, Nunica, MI (US)

(73) Assignee: ECO Holding 1 GmbH, Marktheidenfeld (DE)

( * ) Notice: Subject to any disclaimer, the term of this patent is extended or adjusted under 35 U.S.C. 154(b) by 0 days.

(21) Appl. No.: 16/107,474

(22) Filed: Aug. 21, 2018

(65) Prior Publication Data

US 2019/0085736 A1 Mar. 21, 2019

Related U.S. Application Data

(60) Provisional application No. 62/633,180, filed on Feb. 21, 2018, provisional application No. 62/560,273, filed on Sep. 19, 2017.

(51) Int. Cl.
*F01L 1/344* (2006.01)
*F16K 1/00* (2006.01)

(52) U.S. Cl.
CPC ............ *F01L 1/3442* (2013.01); *F01L 1/344* (2013.01); *F16K 1/00* (2013.01); *F01L 2001/3443* (2013.01); *F01L 2001/3444* (2013.01); *F01L 2001/34426* (2013.01); *F01L 2001/34433* (2013.01); *F01L 2820/01* (2013.01)

(58) Field of Classification Search
CPC ..... F01L 2001/34426; F01L 2001/3443; F01L 2001/34433; F01L 1/46

USPC ....................................................... 123/90.15
See application file for complete search history.

(56) References Cited

U.S. PATENT DOCUMENTS

| | | | |
|---|---|---|---|
| 7,000,580 B1 | 2/2006 | Smith | |
| 2012/0048410 A1 | 3/2012 | Shimasaki | |
| 2013/0284134 A1* | 10/2013 | Methley | F01L 1/344 |
| | | | 123/90.17 |
| 2016/0010515 A1* | 1/2016 | Snyder | F01L 1/3442 |
| | | | 123/90.15 |
| 2017/0022854 A1* | 1/2017 | Takada | F01L 1/3442 |
| 2017/0241302 A1 | 8/2017 | Haltiner, Jr. | |
| 2017/0260882 A1 | 9/2017 | Brower | |

(Continued)

FOREIGN PATENT DOCUMENTS

| | | |
|---|---|---|
| DE | 102009018044 | 10/2010 |
| DE | 102013104031 A1 | 10/2014 |

(Continued)

*Primary Examiner* — Jorge L Leon, Jr.
(74) *Attorney, Agent, or Firm* — Von Rohrscheidt Patents

(57) ABSTRACT

An oil control valve for a cam phaser of an internal combustion engine where the spool is positioned by an external actuator. The valve includes a spool assembly including a spool that is axially movable in a central opening, and there is at least one groove in the spool. The groove substantially increases fluid flow through the hydraulic valve when opened. By controlling the size and position of the groove, the amount of the fluid flow may be controlled. Further fluid flow control may be had by controlling the size of holes in the spool. The increase of fluid flow attributable to the groove may be at least 50%, 100% or even 200% compared with the at least one groove being absent.

17 Claims, 8 Drawing Sheets

(56) References Cited

U.S. PATENT DOCUMENTS

2017/0260883 A1* 9/2017 Benischek ............ F01L 1/3442
2018/0156080 A1* 6/2018 Yamakawa ........... F01L 1/3442

FOREIGN PATENT DOCUMENTS

| DE | 102014114847 A1 | 4/2016 |
| EP | 2508723 A2 | 10/2012 |
| EP | 2966272 A2 | 1/2016 |

* cited by examiner

Meter off groove, groove at hole diameter

Groove 0.5 mm after hole opening, less number of holes

Meter flow with holes only

Groove 0.8 mm after hole opening

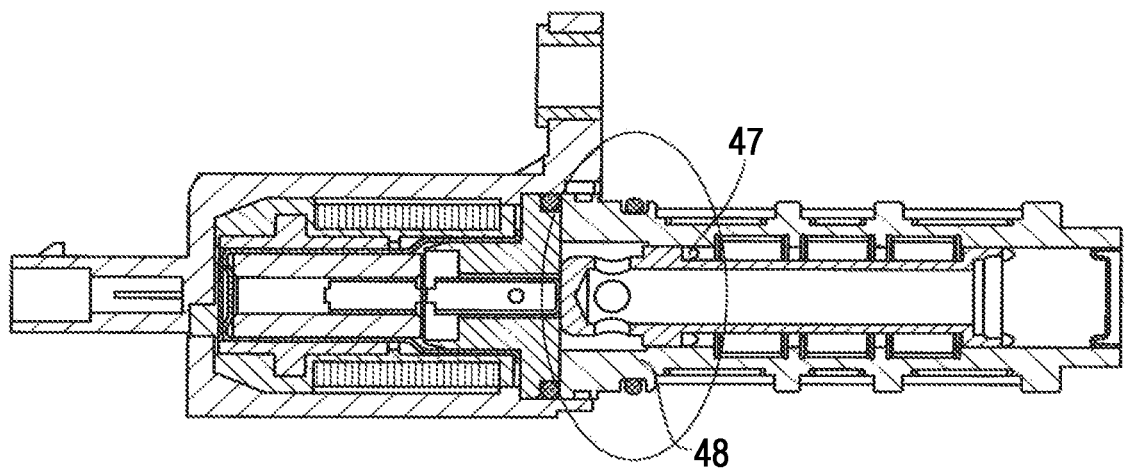
FIG. 14
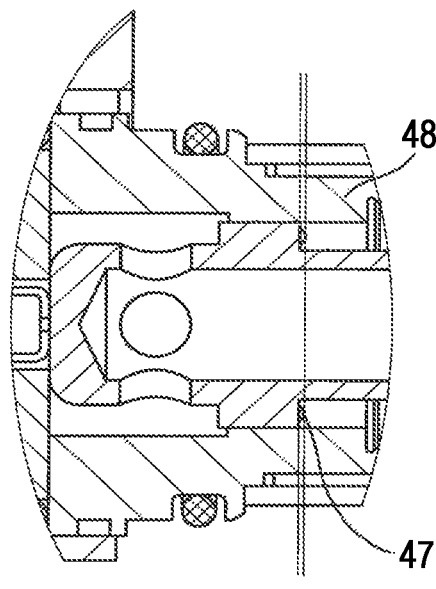 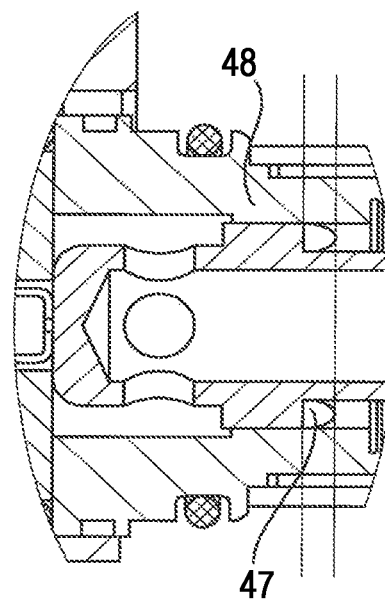
FIG. 15          FIG. 16

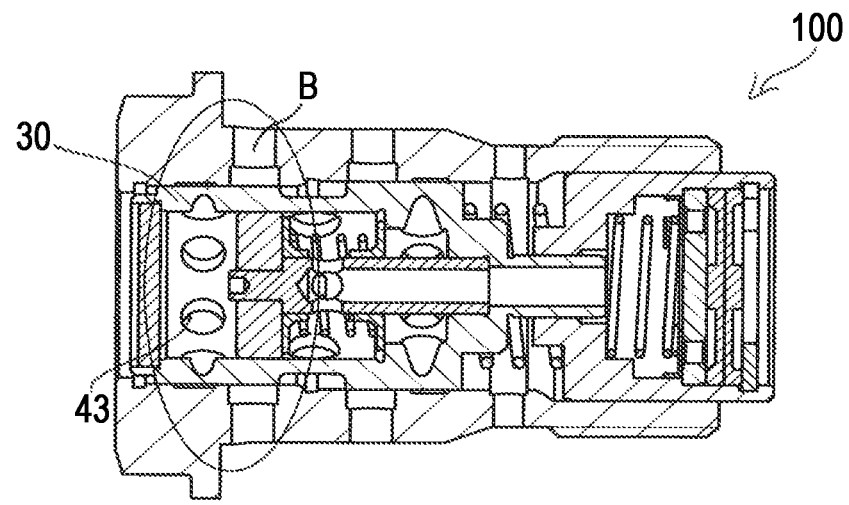
FIG. 17
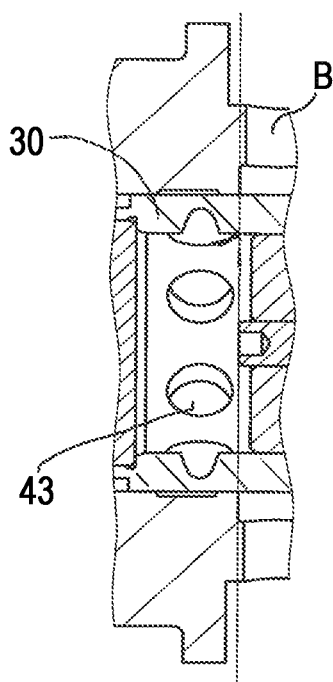 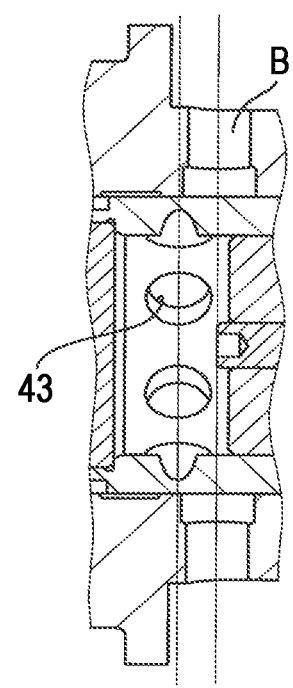
FIG. 18  FIG. 19

OIL CONTROL VALVE TO CONTROL A CAM PHASER WITH A SPOOL POSITIONED BY AN EXTERNAL ACTUATOR AND HAVING A GROOVE

RELATED APPLICATIONS

This application claims priority from, and incorporates by reference, US provisional applications Ser. No. 62/522,624, filed on Sep. 19, 2017, and Ser. No. 62/633,180, filed Feb. 21, 2018.

FIELD OF THE INVENTION

The invention relates to an oil control valve for a cam phaser of an internal combustion engine where the spool is positioned by an external actuator and the spool has a groove.

BACKGROUND OF THE INVENTION

Hydraulic valves for cam phasers for internal combustion engines are well known in the art. The hydraulic valve includes a piston that is axially movable in a housing of the hydraulic valve and that controls a hydraulic loading of the cam phaser. Desired hydraulic valves come in many different configurations and new original designs are often required for each new desired. Accordingly, there is a need in the art to reduce the need for original designs when designing a new hydraulic valve.

BRIEF SUMMARY OF THE INVENTION

An object of the invention is to provide a hydraulic valve for a cam phaser including a spool assembly including a spool that is axially movable in a central opening of a valve housing, and at least one groove on an outside of the spool. The spool assembly has at least a first position, a second position corresponding to a hold position, and a third position, and fluid flows through the hydraulic valve when the spool assembly is in either the first position or third position. Additional positions between are possible. The at least one groove substantially increases fluid flow through the hydraulic valve when the at least one groove is opened while in either the first position or the third position or both the first and third positions. The spool assembly may include a check valve tube and a check valve disc provided in one piece. The hydraulic valve may be pressure balanced. The at least one groove may substantially increase fluid flow through the hydraulic valve when the at least one groove is opened while in the first position only or the third position only instead of both of those positions. The at least one groove may substantially increase fluid flow through the hydraulic valve as soon as a spool stroke enters the first position and/or third position, or may do so after a spool stroke travels a predetermined distance in the first position and/or third position. The at least one groove may be uniform or may have a smaller grooved portion and a larger grooved portion. The at least one groove increases fluid flow by at least 50%, 100%, or even 200% compared with the at least one groove being absent. The spool may include plural holes of the same size or may include plural holes of at least two different sizes.

Another objection of the invention is to provide a hydraulic valve for a cam phaser including a spool assembly including a spool that is axially movable in a central opening of a valve housing. The spool assembly has a first check valve and a second check valve axially arranged in the spool which prevent an unintentional outflow of a hydraulic fluid flowing through the spool assembly from an inner space of the spool assembly in a first flow through first openings of the spool and a second flow through second openings of the spool associated respectively with a first operating connection and a second operating connection. The spool assembly has at least a first position, a second position, and a third position. The hydraulic fluid can flow from the first operating connection to the second operating connection when the spool assembly is in the first position, the hydraulic fluid does not flow between the first operating connection and the second operating connection when the spool assembly is in the second position, and the hydraulic fluid can flow from the second operating connection to the first operating connection when the spool assembly is in the third position. The operating connection and the second operating connection are opened and closed according to a position of the spool. Check valves are axially movable on a supply tube of the spool assembly and have opposite opening direction. The first cheek valve may abut on a recess of the spool and the second check valve may abut on a check valve disc. The check valve disc may be fixed to an end of the supply tube. The check valve disc and the supply tube may be provided in one piece. The spool may include plural holes merging into at least one groove on the outside of the spool, wherein the at least one groove substantially increases fluid flow through the hydraulic valve when the at least one groove is opened while in either the first position or the third position or both the first and third positions. The spool may include plural holes all having the same size. The spool may include plural holes of at least two different sizes. The at least one groove may be offset from the holes.

BRIEF DESCRIPTION OF THE DRAWINGS

Other advantages, features and details of the invention can be derived from the subsequent description of advantageous embodiments and from the drawing figures. The features and feature combinations recited in the preceding description and the features and feature combinations recited and shown individually in the figure description and in the figures are not only usable in the respectively recited combination but also in other combinations or by themselves without departing from the spirit and scope of the invention. Identical or functionally equivalent elements are designated with identical reference numerals. For reasons of clarity it is possible that elements are not designated with reference numerals in all figures without losing their association, wherein:

FIG. 14 illustrates flow through holes in a housing;

FIG. 15 illustrates small flow area;

FIG. 16 illustrates an increased flow area corresponding to where a groove is exposed to increase the flow;

FIG. 17 illustrates flow through holes in a spool;

FIG. 18 illustrates a hole edge at a port edge;

FIG. 19 illustrates an increased flow area; and

DETAILED DESCRIPTION OF THE INVENTION

The invention relates to an oil control valve for a cam phaser of an internal combustion engine where the spool is positioned by an external or and has a groove. In the prior art, metering of flow from a supply passage to a control passage is accomplished by opening ports on drilled passage holes. When the spool moves, and ports begin to open, only a small area of the hole is uncovered to flow oil. This is important in a cam phaser oil control valve where a mid-position is used to hold a phaser position and small flow is needed on either side of the hold position (advanced or retard) to make up for leakage. Additional spool travel uncovers a larger area and increases the flow when fast movement of the phaser is desired. However, unlike the prior art, the invention uses drilled passage holes to meter flow near the hold position and places a groove further into the travel allowing increased flow for fast phaser movement. Advantageously the oil control valve is pressure balanced. Advantageously the oil control valve may include a check valve tube and a check valve disc provided in one piece.

Figure 1:
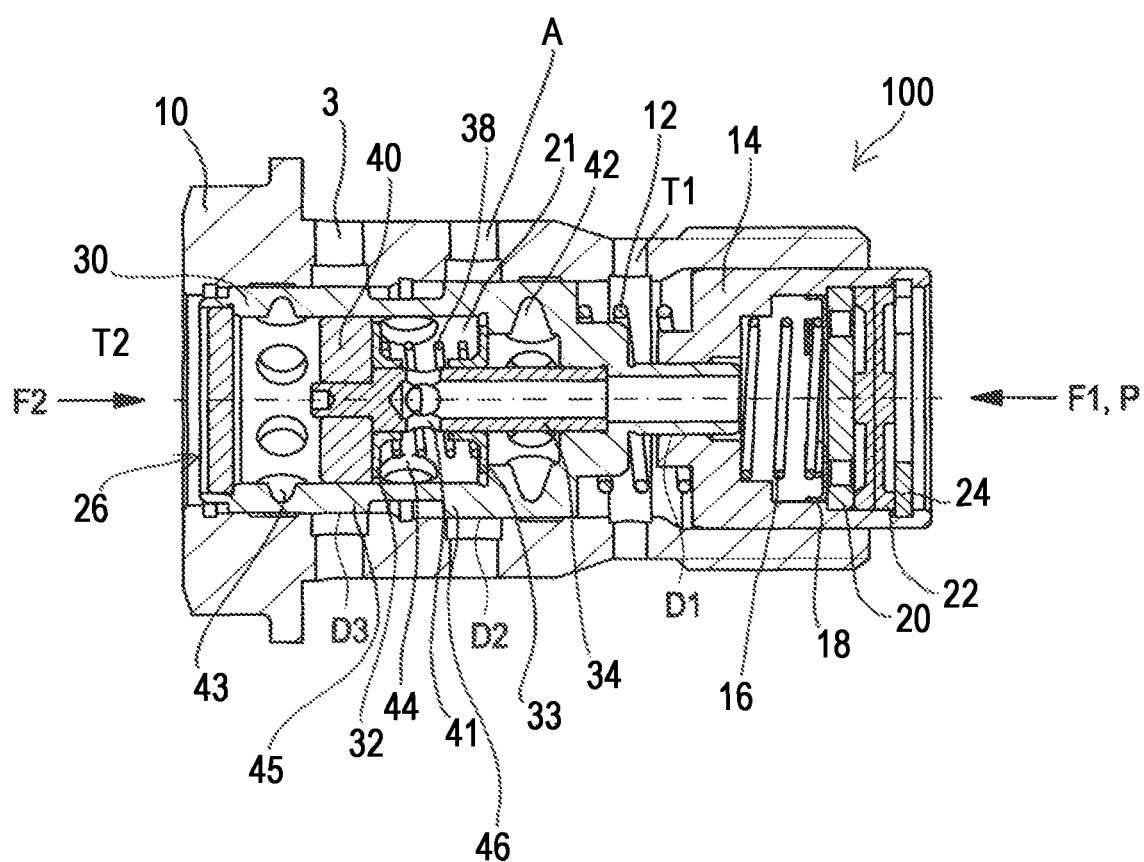
FIG. 1 illustrates an exemplary embodiment of an oil control valve assembly of the invention.

FIG. 1 illustrates an exemplary embodiment of an oil control valve 100 of the invention. The oil control valve 100 includes a central valve housing 10, a spring 12, a calibration cap 14, a spring 16, a check valve 18, a flow disc 20, a supply filter 22, a snap ring 24, a spool assembly 26, a spool 30, a first check valve 32, a second check valve 33, a supply tube 34 and check valve disc 40 and a spring 38. The plate check valves 32, 33 are axially arranged in the spool 30 and axially movable on the supply tube 34 and have opposite opening directions. They abut on a recess of the spool 30 and the check valve disc 40. The supply tube 34 extends through an inner space 21 of the spool 30 and right end of the supply tube 34 is positioned in a recess of the spool 30. The check valve disc 40 is fixed to a left end of the supply tube 34, which comprises radial supply openings 41 that enter between the check valves 32, 33. The valve housing 10 has a stepped bore with working connections (operating connections A, B emerging therefrom, wherein the spool 30 is axially displaceable within the bore and is displaceable with a first outside diameter D3 within a bore section in a sealing manner with tolerance. The spool 30 has, adjacently, following said first outside diameter D3 a lateral surface with a large outside diameter D2 and a lateral surface with a small outside diameter D1. A supply pressure introduced into a cavity of the spool 30 is applied firstly to a projected circular surface, which is formed by the small outside diameter D1, such that a force F1 is effective in an axial direction. The supply pressure is applied secondly to a projected annular surface which is formed from the large outside diameter D2 minus the first outside diameter D3, such that a force F2 is effective in an opposite axial direction. The spool 30 is pressure balanced since the circular surface is at least nearly identical to the annular surface. The hollow piston spool 30 being pressure balanced, also known as pressure compensated, is further discussed in U.S. Pat. No. 9,739,182, which is incorporated herein in its entirety by this reference.

The first check valve 32 and the second check valve 33 prevent an unintentional outflow of a hydraulic fluid flowing through the spool assembly from the inner space 21 of the spool assembly in a first flow through first openings 42 of the spool 30 and a second flow though second openings 43 of the spool 30 associated respectively with a first operating connection A and a second operating connection B, The openings 42, 43 can be drilled holes.

The valve 100 includes at least a first position (starting position), a second position (middle or hold position) shown in FIG. 1 and a third position (end position). In the starting position, second operating connection B is connected to fluid supply P via the supply tube 34, the radial supply openings 41 and third openings 44 of the spool 30 and the second check valve 33 results in the cam torque recirculation of oil from A to B. In order to hydraulically supply the cam phaser plural connections A, B, P, T1 (located in the center of the housing 10), T2 (located on the left end) are provided. In the shown middle position spool lands 45, 46 block. A and B to hold the cam phaser position. There is no recirculation or exhaust in the middle position. In the end position, first operating connection A is connected to fluid supply P via the supply tube 34, the radial supply openings 41 and third openings 44 of the spool 30 and the first plate check valve 32 results in the cam torque recirculation of oil from B to A.

Figure 2:
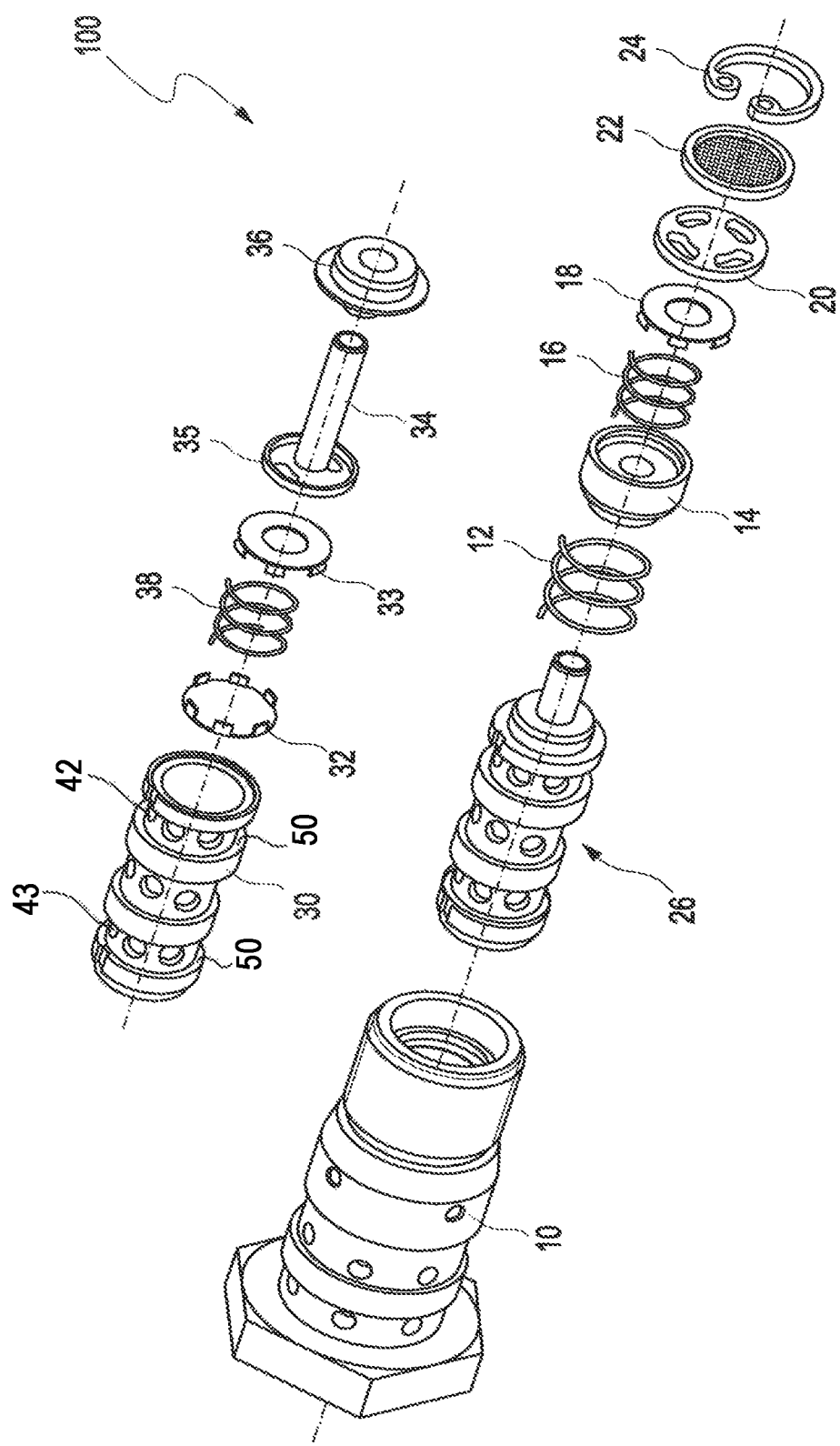
FIG. 2 illustrates an exploded view of another exemplary embodiment of an oil control valve for a cam phaser of an internal combustion engine of the invention.

FIG. 2 illustrates an exploded view of another embodiment of an oil control valve 100 for a cam phaser of an internal combustion engine. The oil control valve includes a central valve housing 10, a spring 12, a calibration cap 14, a spring 16, a check valve 18, a flow disc 20, a supply filter 22, a snap ring 24, a spool assembly 26, a spool 30, check valve 32, check valve 33, a supply tube 34 and flow disc 35, a cal-stop 36, and a spring 38. The spool assembly 26 or the spool 30 or both include one or more grooves 50 on the outside of the spool 30. The plate check valves 32, 33 are axially arranged in the spool 30 and have opposite opening directions. They abut on a recess of the spool 30, the flow disc 35 or a separate check valve disc (not shown) alternatively. First and second openings 42, 43 of the spool 30 merge into grooves 50 which allow to increase fluid flow when one of the grooves 50 are opened in the first or the third position of the valve 100.

Figure 3:
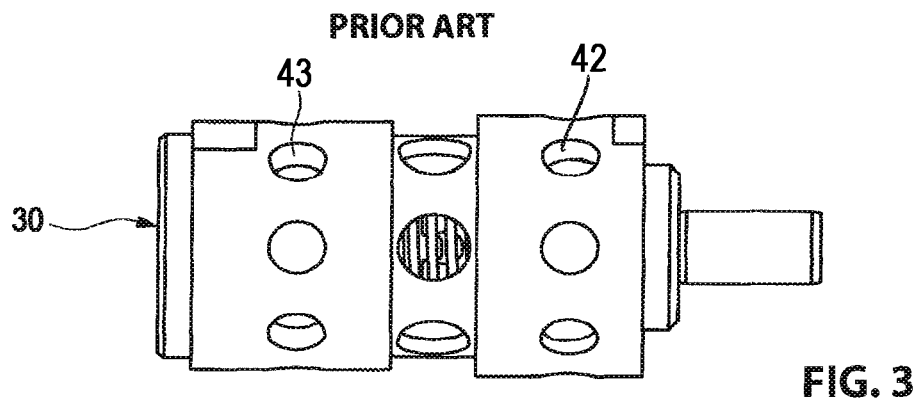
FIG. 3 illustrates an exemplary embodiment of a prior art spool where openings in the spool meter oil flow.

FIG. 3 illustrates an exemplary embodiment of a prior art spool 30 where openings 42, 43 in the spool meter oil flow.

Figure 4:
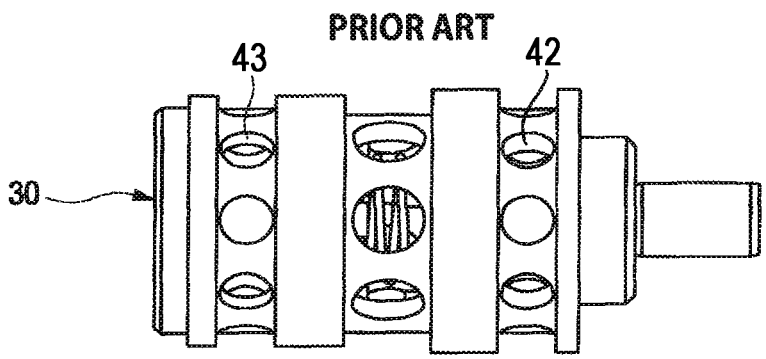
FIG. 4 illustrates a second exemplary embodiment of a prior art spool where openings in the spool meter oil flow.

FIG. 4 illustrates a second exemplary embodiment of a prior art spool 30 where holes (also called openings) 42, 43 in the spool meter oil flow. The spool 30 of FIG. 4 has improved oil flow compared to the oil flow provided by the spool 30 of FIG. 3 but the improved oil flow comes at the cost of control at the hold position.

Figure 5:
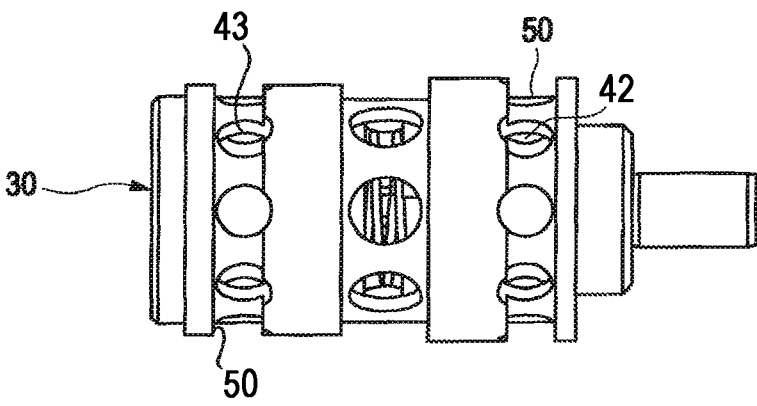
FIG. 5 illustrates a first exemplary embodiment of a spool where openings in the spool meter oil flow.

FIG. 5 illustrates a first exemplary embodiment of a spool 30 where openings 42, 43 in the spool 30 meter oil flow. The spool of FIG. 5 includes grooves 50 that allow for increased oil flow when the spool 30 travels enough to open the grooves 50 and allow additional oil to flow. This spool 30 provides the good control in the hold similar to the spool 30 of FIG. 3 but also provides a high flow rate similar to the spool 30 of FIG. 4 once the spool travels enough to open the grooves 50. As it can be seen the grooves 50 are offset from the openings (drilled holes) 42, 43. These grooves 50 allowing for an increased oil flow rate could also be called high flow rate grooves 50. By selecting the size of the grooves 50, the rate flow increase per mm of spool 30 travel can be controlled. The larger the size of the grooves 50, the larger the rate of flow increase per mm of spool 30 travel. These high flow rate grooves 50 differ from other grooves that have been incorporated into spools. For example, grooves used to remove contamination would fail to provide the additional flow of oil provided by the grooves 50 of the invention.

Figure 6:
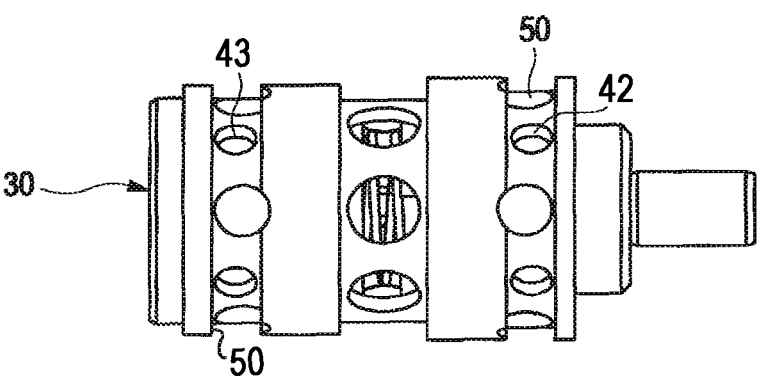
FIG. 6 illustrates a second exemplary embodiment of a spool that is similar to the spool of FIG. 5, but the openings are of different sizes.

FIG. 6 illustrates a second exemplary embodiment of a spool 30 that is similar to the spool 30 of FIG. 5 but the openings 42, 43 are of different sizes.

Flow versus travel around the hold position can be set by the size and number of holes 42, 43 at the control edge. Thus, the oil flow provided by the spool 30 of FIG. 5 around the hold position is smaller than that provided by the spool 30 of FIG. 6 because some of the openings of FIG. 6 are smaller than those of FIG. 5.

Figure 7:
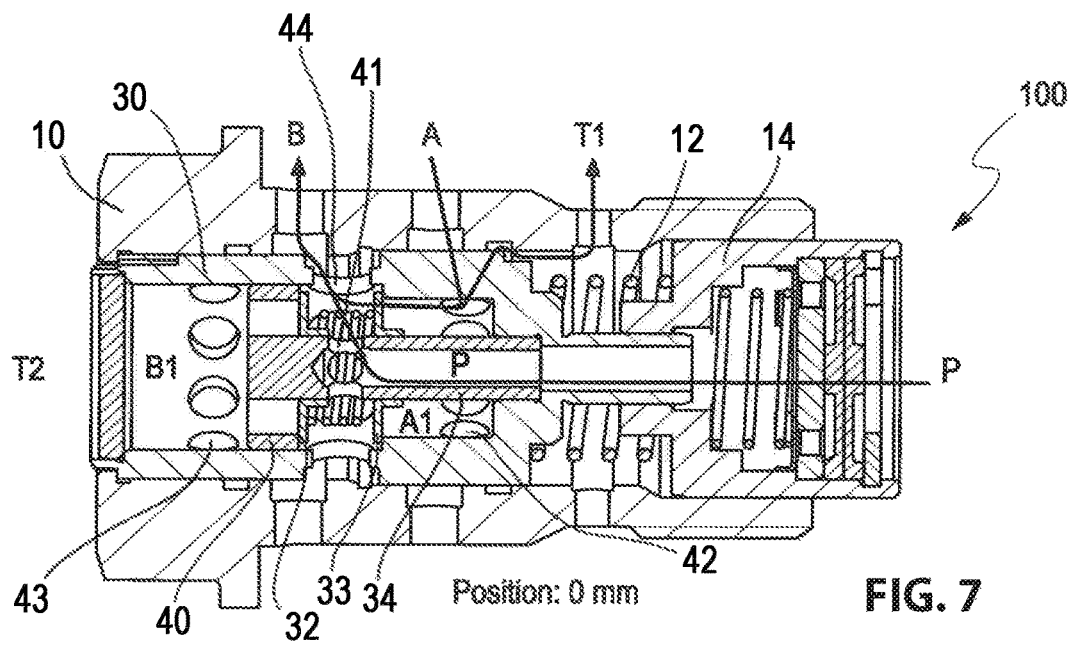
FIG. 7 illustrates another embodiment of an oil control valve assembly of the invention with a 0 mm travel (starting position)

FIG. 7 illustrates an oil control valve 100 which is quite similar to the valve 100 according FIG. 1. In contrast to FIG. 1 the supply tube 34 and the check valve disc 40 being provided in one piece. That simplifies manufacture and reduces the numbers of pieces. In the starting position with a 0 mm travel second operating connection B is connected to fluid supply P via the supply tube 34, the radial supply openings 41 and the third openings 44 of the spool 30 and the second check valve 33 results in the cam torque recirculation of oil from A to B, First operating connection A is additionally connected to a tank connection T1. In order to hydraulically supply the cam phaser plural connections A, B, P, T1 (located in the center of the housing 10), T2 (located on the left end) are provided.

Figure 8:
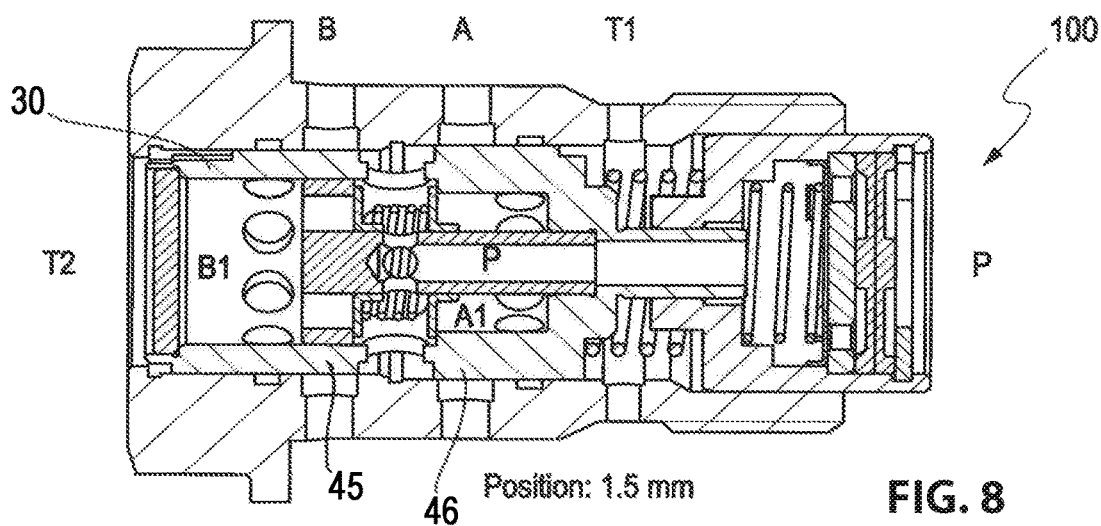
FIG. 8 illustrates the oil control valve according FIG. 7 with a 1.5 mm ravel (middle or hold position)

FIG. 8 illustrates the oil control valve 100 with a 1.5 mm travel (middle or hold position). In middle position, the spool lands 45, 46 block A and B to hold the cam phaser position. There is no recirculation or exhaust in the middle position.

Figure 9:
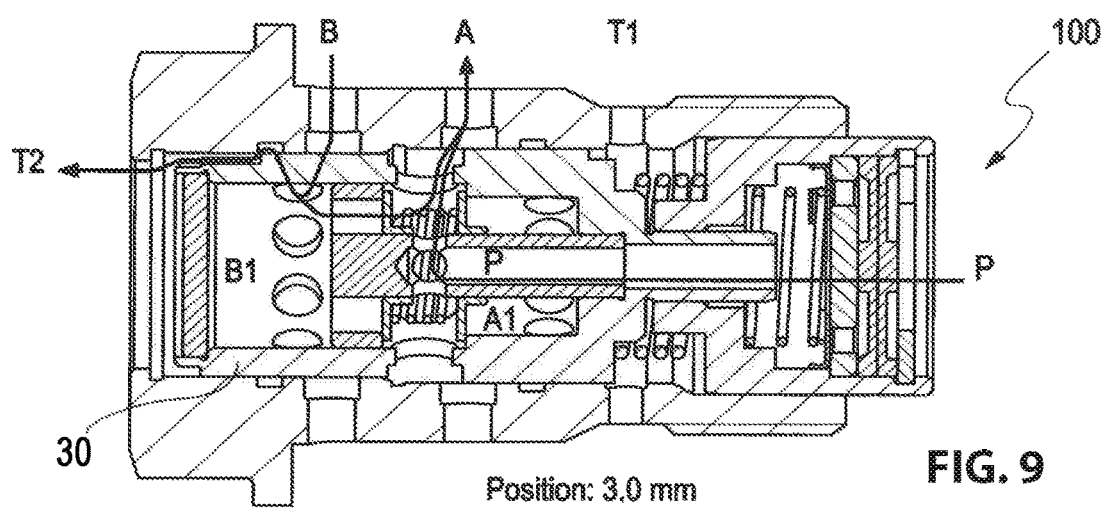
FIG. 9 illustrates the oil control valve according FIG. 7 with a 3 mm travel (end position)

FIG. 9 illustrates the oil control valve 100 with a 3 mm travel (end position) in the end position, the first plate check valve 32 results in the cam torque recirculation of oil from B to A. Second operating connection B is additionally connected to a tank connection T2.

Openings 42, 43 of the spool 30 can merge into grooves 50 which allow to increase fluid flow when one of the grooves 50 are opened in the first or the first position of the valve 100 according the embodiment shown in FIG. 5 or FIG. 6.

Figure 10:
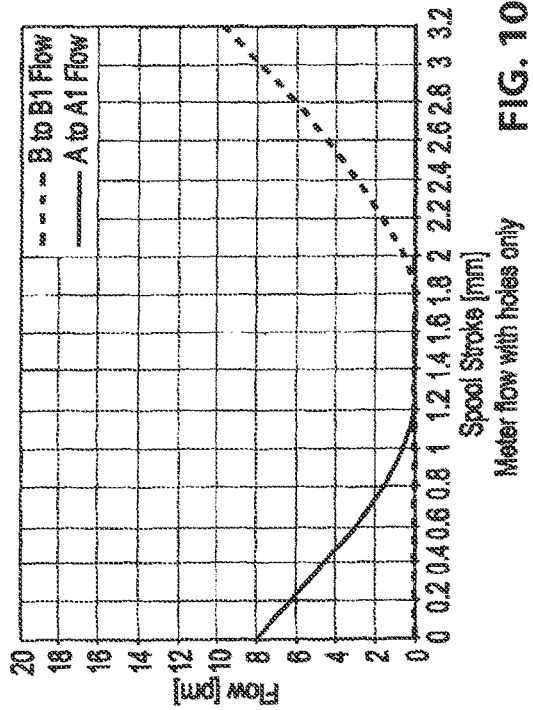
FIG. 10 is a graph of flow rate versus spool stroke for a spool having holes but no grooves such as the spool from FIG. 3.

FIG. 10 is a graph of flow rate versus spool stroke for a spool 30 having holes 42, 43 but no grooves such as the spool 30 from FIG. 3.

Figure 11:
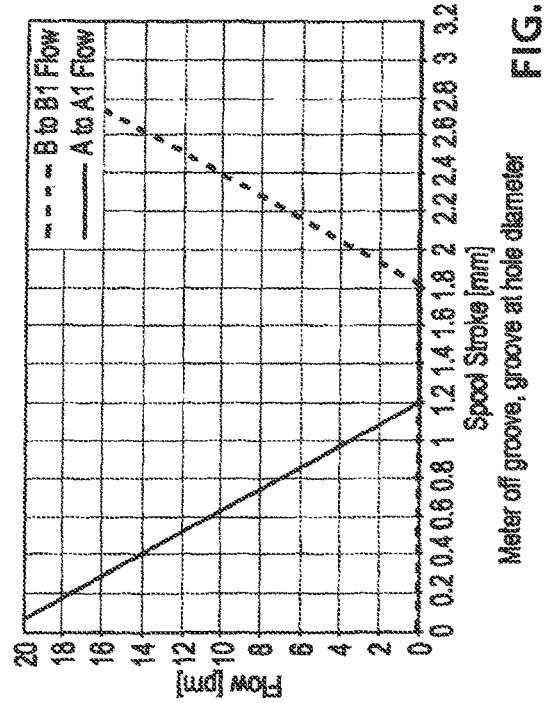
FIG. 11 is a graph of flow rate versus spool stroke for a spool having holes and a groove starting at the hole diameter such as the spool from FIG. 4.

FIG. 11 is a graph of flow rate versus spool stroke for a spool 30 having holes 42, 43 and a groove 50 starting at the hole diameter such as the spool 30 from FIG. 4. The groove 50 greatly increases the flow rate. Note, the rate of flow increase for the spool movement is greatly enhanced.

Figure 12:
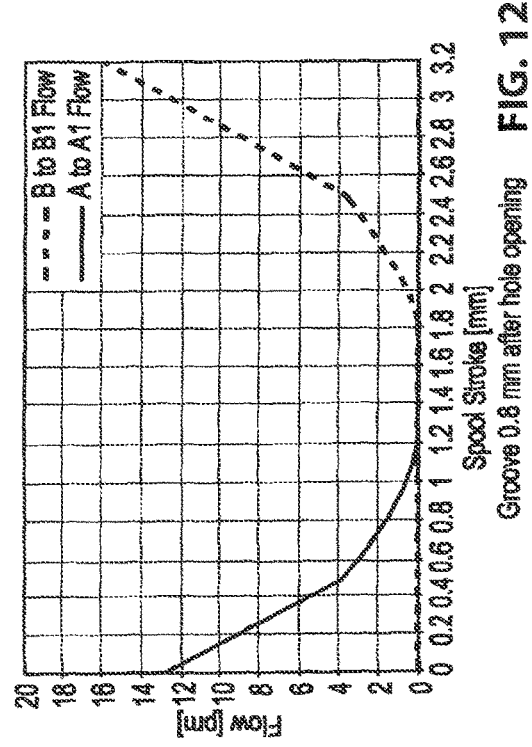
FIG. 12 is a graph of flow rate verso versus spool stroke for a spool having holes and a groove starting 0.8 mm after the hole opening such as the spool from FIG. 5.

FIG. 12 is a graph of flow rate versus spool stroke for a spool 30 having holes 42, 43 and a groove starting 0.8 mm after the hole opening such as the spool 30 from FIG. 5. Here the flow rate essentially matches FIG. 10 which does not include grooves 50 until 0.8 mm from the hole, the groove is opened and the flow increases.

Figure 13:
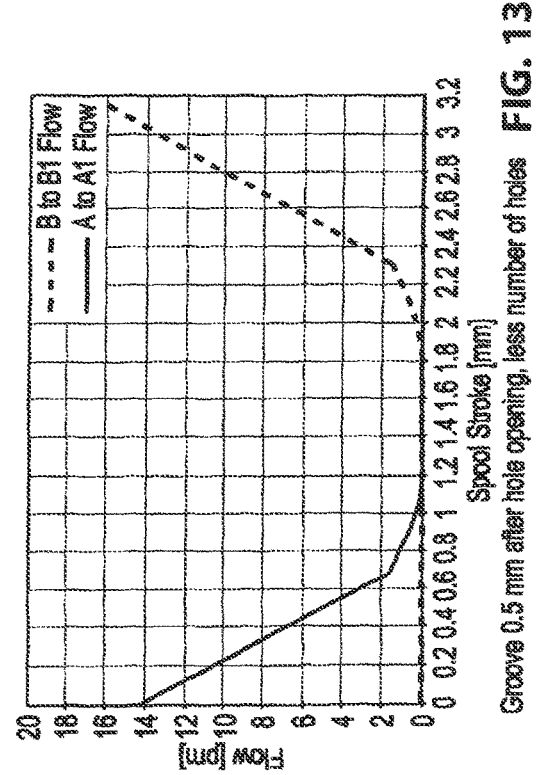
FIG. 13 is a graph of flow rate versus spool stroke for a spool having fewer holes and a groove starting 0.5 mm after the hole opening such as the spool from FIG. 6.

FIG. 13 is a graph of flow rate versus spool stroke for a spool 30 having fewer holes and a groove 50 starting 0.5 mm after the hole opening such as the spool 30 from FIG. 6. Here the flow rate is reduced due to the fewer holes as compared to FIG. 10. Once the spool travels 0.5 mm from the hole, the groove 50 is opened and the flow increases.

The flow rate from the hole opening 42, 43 and the flow rate from the groove 50 may be considered the total flow rate. The amount of flow increase per mm of spool stroke where the groove 50 is opened is typically a substantial portion of the amount of the total flow increase for a given spool stroke where the groove is open. Stated another way, the flow increase where the groove 50 is open is substantially increased compared to where the groove 50 is not open. Advantageously, the flow increase from the groove 50 is at least 50% of the flow increase provided by the hole opening 42, 43, with it being even more for some embodiments. For example, the grooves 50 may provide, at least 100%, or at least 200%, or even more as compared with the flow increase from the holes 302.

FIG. 14 illustrates flow through holes 47 in a housing 48.

FIG. 15 illustrates small flow area. Small flow area occurs in prior art devices and in the present invention where a groove 50 is not exposed to increase the flow.

FIG. 16 illustrates an increased flow area corresponding to where a groove 50 is exposed to increase the flow.

FIG. 17 illustrates flow through holes 43 in a spool 30.

FIG. 18 illustrates a hole edge of the holes 43 at a port edge of the second operating connection B.

FIG. 19 illustrates an increased flow area of the holes 43.

Figure 20:
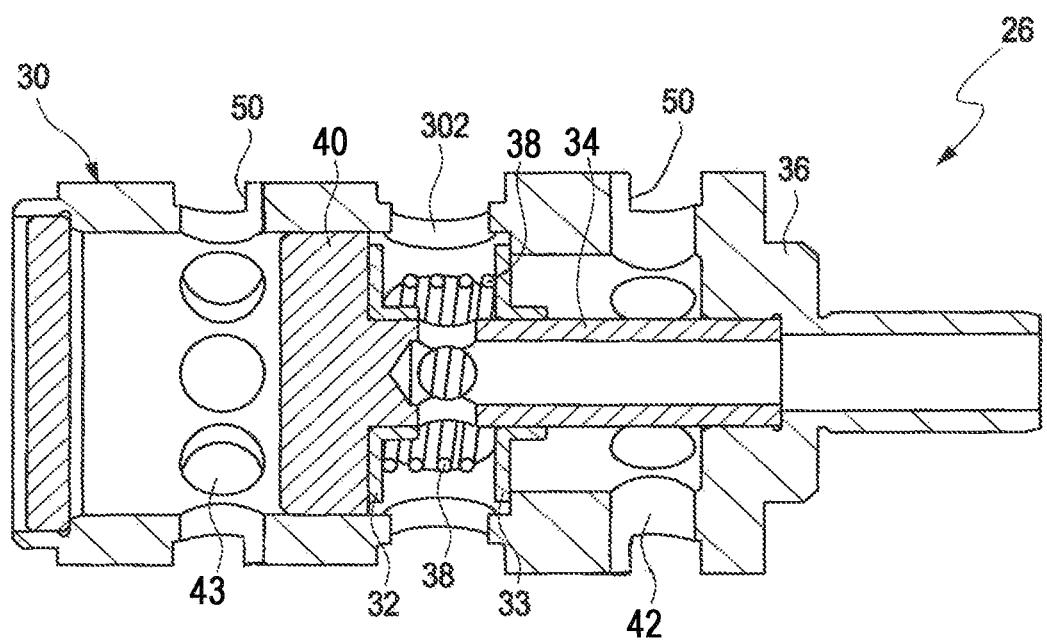
FIG. 20 illustrates an exemplary spool assembly with grooves which are offset from the holes.

FIG. 20 illustrates an exemplary spool assembly 26 which is similar to valve 100 according FIG. 7. In contrast to FIG. 7 openings 42, 43 of the spool 30 can merge into grooves 50 which allow an increased fluid flow when one of the grooves 50 is opened in the first or the third position of the valve 100. The grooves 50 are offset from the openings 42, 43 according the grooves 50 shown in FIG. 5. So the flow is reduced when only the edge of the openings 42, 43 is opened. When the spool 30 moves and uncovers the groove 50 the flow increases. The flow around the center provided a good control to maintain a fixed phaser position. Uncovering the groove 50 increases the flow when it's desirable to quickly move the phaser from one position to another. The supply tube 34 and the check valve disc 40 being provided in one piece. That simplifies manufacture, reduces leaks, and improves the life span of the oil control valve 100.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:
1. A hydraulic valve for a cam phaser, the hydraulic valve comprising:
 a spool assembly including a spool that moves axially in a central opening of a valve housing; and
 at least one groove on an outside of the spool, the at least one groove including a plurality of radial openings, wherein the spool assembly has at least a first position, a second position corresponding to a hold position, and a third position, wherein fluid flows through the hydraulic valve when the spool assembly is in either the first position or third position, and wherein a circumference of at least a portion of the plurality of radial openings partially cuts into an axial side wall of the at least one groove thereby providing an increased fluid flow through the hydraulic valve when the at least one groove is opened while in either the first position or the third position or both the first and third positions.

2. The hydraulic valve according to claim 1, wherein the spool assembly includes a check valve tube and a check valve disc provided in one piece.

3. The hydraulic valve according to claim 1, wherein the hydraulic valve is pressure balanced.

4. The hydraulic valve according to claim 1, wherein the at least one groove substantially increases fluid flow through the hydraulic valve when the at least one groove is opened while in the first position only.

5. The hydraulic valve according to claim 1, wherein the at least one groove substantially increases fluid flow through the hydraulic valve when the at least one groove is opened while in the third position only.

6. The hydraulic valve according to claim 1, wherein the at least one groove substantially increases fluid flow through the hydraulic valve when the at least one groove is opened while in the first position and the third position.

7. The hydraulic valve according to claim 1, wherein the at least one groove substantially increases fluid flow through the hydraulic valve as soon as a spool stroke enters the first position.

8. The hydraulic valve according to claim 1, wherein the at least one groove substantially increases fluid flow through the hydraulic valve as soon as a spool stroke enters the third position.

9. The hydraulic valve according to claim 1, wherein the at least one groove substantially increases fluid flow through the hydraulic valve after a spool stroke travels a predetermined distance in the first position.

10. The hydraulic valve according to claim 1, wherein the at least one groove substantially increases fluid flow through the hydraulic valve after a spool stroke travels a predetermined distance in the third position.

11. The hydraulic valve according to claim 1, wherein the at least one groove is uniform.

12. The hydraulic valve according to claim 1,
wherein the at least one groove has a first grooved portion and a second grooved portion, and
wherein the first grooved portion has smaller grooves than the second grooved portion.

13. The hydraulic valve according to claim 1, wherein the at least one groove increases fluid flow by at least 50% compared with the at least one groove being absent.

14. The hydraulic valve according to claim 1, wherein the at least one groove increases fluid flow by at least 100% compared with the at least one groove being absent.

15. The hydraulic valve according to claim 1, wherein the at least one groove increases fluid flow by at least 200% compared with the at least one groove being absent.

16. The hydraulic valve according to claim 1, wherein the spool includes plural holes all having a same size intersecting the at least one groove.

17. The hydraulic valve according to claim 1, wherein the spool includes plural holes of at least two different sizes intersecting the at least one groove.

* * * * *